Feb. 16, 1926.
J. G. KING
REFRIGERATING APPARATUS
Filed May 30, 1923

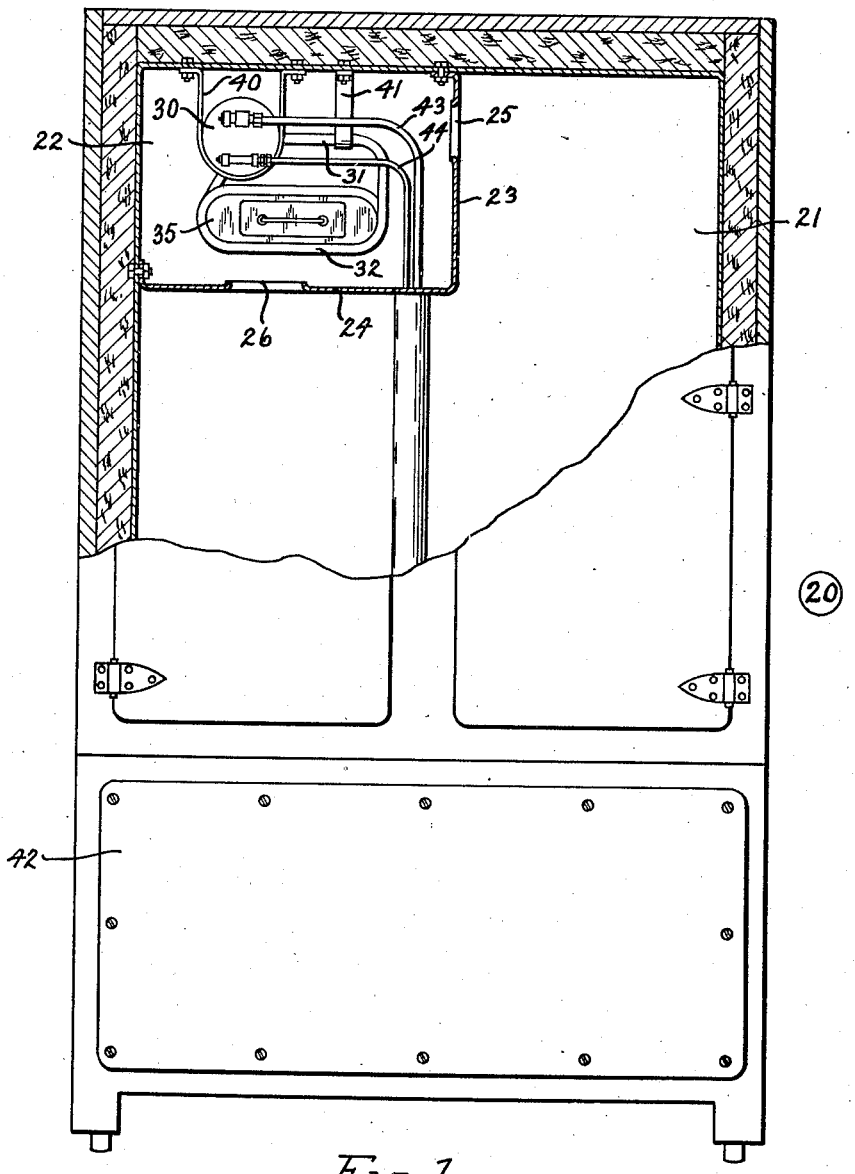

Witnesses
Lloyd M. Keighley
Charles E. Greene

Inventors
Jesse G. King
J. Ralph Fehr
By
His Attorney

Patented Feb. 16, 1926.

1,573,114

UNITED STATES PATENT OFFICE.

JESSE G. KING, OF DAYTON, OHIO, ASSIGNOR, BY MESNE ASSIGNMENTS, TO GENERAL MOTORS RESEARCH CORPORATION, OF DAYTON, OHIO, A CORPORATION OF DELAWARE.

REFRIGERATING APPARATUS.

Application filed May 30, 1923. Serial No. 642,366.

*To all whom it may concern:*

Be it known that I, JESSE G. KING, a citizen of the United States of America, residing at Dayton, county of Montgomery, State of Ohio, have invented certain new and useful Improvements in Refrigerating Apparatus, of which the following is a full, clear, and exact description.

This invention relates to refrigerating apparatus and more particularly to refrigerating machines for domestic use in which a cooling unit including an evaporator and brine tank is supported within a refrigerator cabinet.

It is among the objects of the invention to simplify the construction of cooling units of this type and to provide for the removal of the brine tank from the evaporator.

Further objects and advantages of the present invention will be apparent from the following description, reference being had to the accompanying drawings, wherein a preferred embodiment of one form of the present invention is clearly shown.

In the drawings:

Fig. 1 is a front elevation of a refrigerator cabinet, a portion thereof being shown in section to show a cooling unit constructed in accordance with the present invention;

Figure 3:
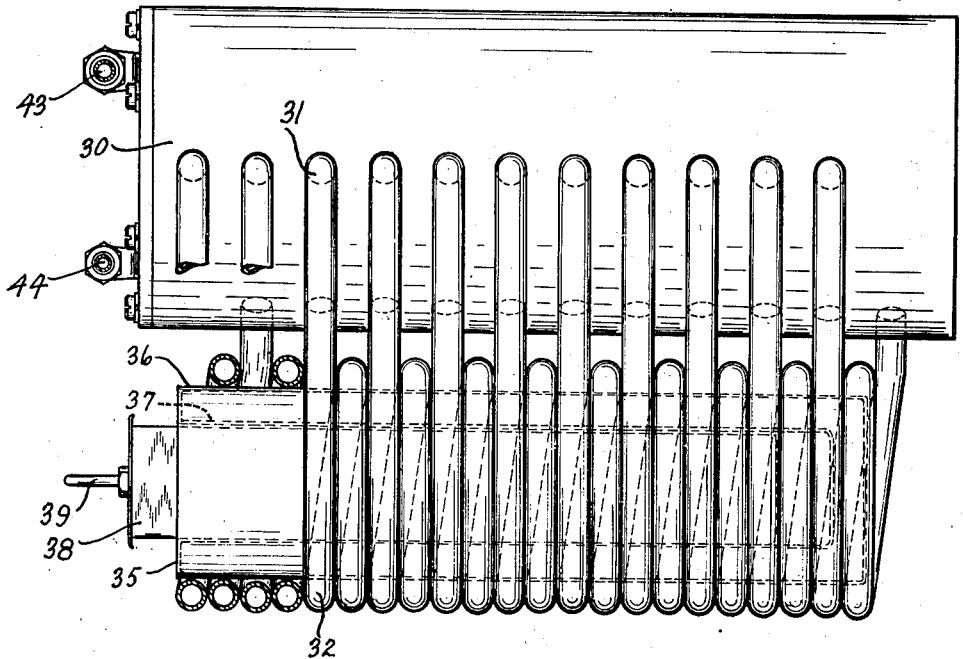
Fig. 3 is a side elevation thereof looking in the direction of the arrow 3 of Fig. 2.
Figure 2:
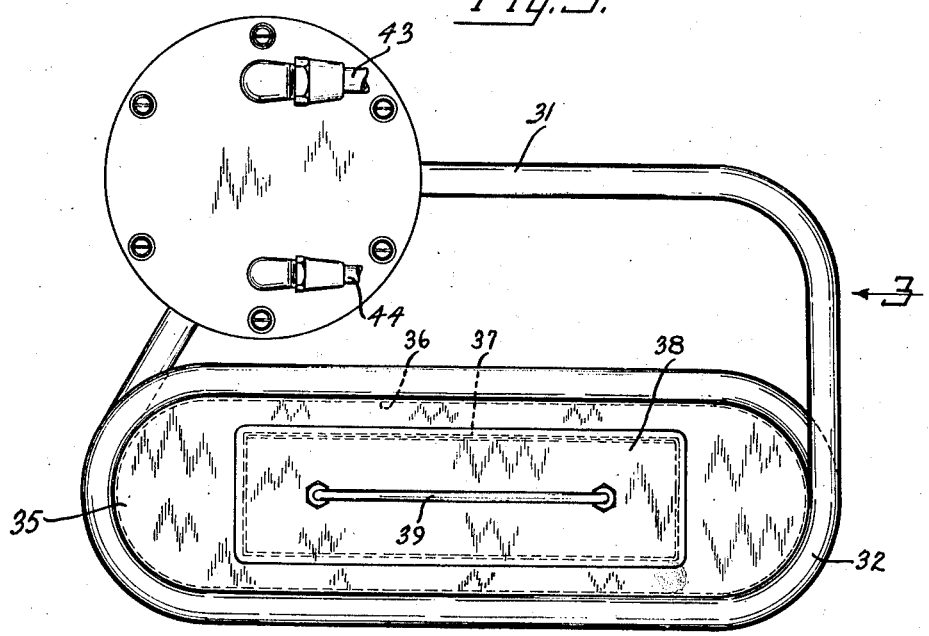
Fig. 2 is a front elevation on a larger scale of the cooling unit of Fig. 1.

Referring to the drawings, 20 designates a refrigerating cabinet including a food compartment 21 and a cooling compartment 22 separated by partition walls 23 and 24. Walls 23 and 24 are provided with openings 25 and 26 to provide for circulation of air through said compartments. The cooling unit includes an evaporator chamber 30 connected with a plurality of pipe coils 31 each provided with a single turn loop 32 which is substantially oblong in contour. The loops 32 of the pipes 31 are contiguous, and provide a recess or pigeon hole for receiving a brine tank 35 which is substantially oblong in end contour.

Tank 35 is provided with spaced outer and inner walls 36 and 37 respectively, the space between these walls receiving a quantity of brine. The inner wall 37 provides a recess for receiving and supporting a tray 38 provided with a handle 39. Tray 38 is adapted to receive one or more vessels containing articles to be frozen, such as water to be frozen into ice cubes.

The evaporator 30 is suspended within the cooling compartment 22 by one or more U-shaped brackets 40, and the pipes 31 are supported by means of bracket 41. The evaporator is connected by means of pipes 43 and 44 with refrigerating machinery which may be located below the food compartment 21 and behind the removable panel 42.

It is apparent from the foregoing that the invention provides for supporting the evaporating chamber by the refrigerating cabinet, for supporting the brine tank by the evaporating chamber, and the ice tray by means of the brine tank. The pipe coils usually associated with the evaporating chamber and the brine tank have been provided with contiguous single turn loops to provide a compartment or pigeon hole for receiving a removable brine tank. The brine tank can therefore be readily removed from the cooling apparatus for a separate transportation in order to relieve the cooling unit of vibration due to agitation, during transportation, of the liquid in the brine tank. This feature of the invention permits removal of the brine tank at any time for repairs or replacement.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What is claimed is as follows:

1. Refrigerating apparatus comprising the combination with a cabinet including a cooling compartment; of an evaporating tank supported by the cabinet; a brine tank; and means for supporting the brine tank by the evaporating tank, said means including a plurality of pipe coils connected with the evaporating tank.

2. Refrigerating apparatus comprising the combination with a cabinet including a cooling compartment; of an evaporating tank supported by the cabinet; a brine tank; a plurality of pipe coils connected with the evaporating tank, each coil having a single turn loop, said loops being contiguous to provide a recess for supporting the brine tank.

3. Cooling apparatus for refrigerators comprising the combination with refrigerant circulating means including a pipe coil; of a brine tank surrounded by said coil and removable therefrom.

4. Cooling apparatus for refrigerators comprising the combination with an evaporating tank, and a plurality of contiguous pipe coils connected therewith, said coils providing a pigeon hole; and a brine tank supported by said coils within said pigeon hole and removable therefrom.

In testimony whereof I hereto affix my signature.

JESSE G. KING.